United States Patent Office 3,616,824
Patented Nov. 2, 1971

3,616,824
LEVEL DETECTOR DEVICE FOR ADDING CONDUCTIVE LIQUID TO A CONTAINER
Daniel Orlando, Brookfield, Wis., assignor to Globe-Union, Inc., Milwaukee, Wis.
Filed Jan. 20, 1970, Ser. No. 4,283
Int. Cl. H01m 7/00
U.S. Cl. 141—198
6 Claims

ABSTRACT OF THE DISCLOSURE

A liquid level detector for adding electrically conductive liquid to a container which comprises an electrically non-conductive feed conduit for directing a stream of conductive liquid to the container, a first electrically conductive probe extending into the container to the desired level of conductive liquid therein, a second electrically conductive probe immersed in the stream of conductive liquid within the feed conduit and control means electrically connected to the first and second probes and operatively associated with the feed conduit for stopping the addition of conductive liquid to the container when the desired level is reached in the container.

BACKGROUND OF THE INVENTION

This invention relates to a liquid level detector device for adding electrically conductive liquid to a desired level in a container and in particular to a detector device for use in the acid filling of storage batteries, which has electrical means responsive to the acid electrolyte level in a cell of a storage battery for insuring that sufficient acid is added to the cell to obtain the desired electrolyte level.

Many devices are known which are responsive to the level of a conductive liquid in a container for filling the container to a proper level. In the battery industry, various liquid level detectors are commonly used to control the amount of acid added to each of the cells of a storage battery during the initial acid charging of the battery. Typical prior art devices have an inlet conduit made of metal or other conductive material which is inserted into a cell of the battery at the desired electrolyte level. Electrical current is applied directly to the inlet conduit. An additional conductive probe is also inserted into the cell so that an electric circuit is completed as soon as the acid level in the cell rises high enough to complete an electrical path between the inlet conduit and the conductive probe. One such device is shown by U.S. Pat. 1,471,238 wherein a pair of concentric metal tubes separated by an insulating tube are inserted into a cell of a storage battery. The inner metal tube, used as a filling tube for adding acid to the cell, is of greater length than the outer metal tube and the upper portions of both tubes are connected to a source of electrical energy. A flexible filling hose for adding acid to the cell is fitted over the upper end of the inner metal tube and electrically-actuated clamping means are provided for closing off the flow of electrolyte through the flexible hose when the acid level in the cell reaches the level of the outer tube and completes an electrical circuit via the conductive path between the inner and outer tubes to activate the clamping means.

Another filling apparatus adapted to be used in acid filling storage batteries is disclosed by U.S. 1,256,065. This apparatus has a nozzle that extends into the battery cell to be filled. The nozzle is provided with a pair of insulated conducting metal rings, one positioned above the other, which are connected to opposite poles of an electrical power source, i.e., a battery. A supply tube is connected to the nozzle for supplying acid electrolyte to the cell and means for controlling flow of electrolyte through the tube are operatively associated with the rings so that the flow is shut off when the level of electrolyte in the cell provides a conductive path between the two rings.

It will be recognized that the filling ports for each cell of most storage batteries are not very large and that the level of electrolyte in the cell is not far below the filling port. Consequently, the distance between the ends of the conductive acid filling tube and the outer tube in the device of U.S. 1,471,238 and the distance between the rings in the apparatus of U.S. 1,256,065 are quite small. Salt deposits have been found to build up on such devices at the outlet of the filling tube or conduit and the areas surrounding the outlet. With the known prior art devices, these salt deposits often cause a short circuit resulting in either stoppage of the filling apparatus or premature indication of a full cell.

SUMMARY OF THE INVENTION

Advantageously, the liquid level detector device of this invention eliminates these problems, in that means are provided substantially above the outlet of a non-conductive filling conduit for completing an electrical circuit when the conductive liquid e.g. acid electrolyte, reaches a conductive probe placed at the desired level. The outlet of the filling conduit can be spaced relatively far from the conductive probe at the desired level in the container, even in a battery cell. Consequently, salt deposit build-ups on the end of the filling conduit or on the conductive probe will not cause shorting of electrical control means for controlling flow of electrolyte into the container.

Thus, this invention contemplates a liquid level detector device for introducing electrically conductive liquid into a container which comprises an electrically non-conductive feed conduit for directing a stream of conductive liquid to the container, an end portion of the conduit extending into the container below the desired level of conductive liquid therein, a first electrically conductive probe extending into the container to the desired level of conductive liquid therein, a second electrically conductive probe immersed in the stream of conductive liquid within another portion of the feed conduit, and control means electrically connected to first and second probes and operatively associated with said feed conduit for allowing the addition of conductive liquid to said container until the desired level is reached.

In particular, this invention is directed to a liquid level detector device for adding acid electrolyte to a cell of a storage battery which comprises a housing adapted to be placed on the battery above the cell to be filled, an electrically non-conductive feed conduit extending through the housing for directing a stream of acid electrolyte into the cell, the outlet of the conduit being positioned below the desired level of acid electrolyte in the cell, a first electrically conductive probe extending into the cell to the desired level of acid electrolyte, a second electrically conductive probe immersed in the stream of acid electrolyte within the feed conduit outside of the cell, flow regulating means connected to said feed conduit for regulating the addition of acid to the cell and control means electrically connected to first and second probes and to the regulating means for allowing the regulating means to add acid to the cell until the desired electrolyte level is reached.

It will be understood that in accordance with this invention, a conductive path for completing an electrical circuit that actuates the electrical control means for stopping further addition of acid electrolyte to the cell of a battery is formed by the stream of conductive liquid, e.g. the acid electrolyte, passing through the feed conduit and the conductive liquid in the container (e.g. the battery cell) which has reached the conductive probe placed at the desired liquid level. With this construction, salt deposits which may form between the sides of the non-conductive feed conduit and the end of the first conductive probe will not cause shorting of the electrical control means.

In accordance with this invention, the housing for positioning the detector device on the cover of a battery has a peripheral wall which extends around a filling port for introducing electrolyte into the cell to be filled. Also the housing has venting means for venting gases from the cell during the addition of acid electrolyte.

The conductive probe positioned at the desired electrolyte level in the cell is preferably in the form of a stainless steel tube which is arranged concentric with and spaced around the feed conduit. The upper portion of the stainless steel tube is adhesively secured (for example with an epoxy resin) or otherwise bonded to the housing. In the embodiment, which is particularly adapted for acid filling of storage batteries, the feed conduit extends vertically through the housing concentric with the stainless steel tube and is also adhesively secured or otherwise bonded to the housing.

The electrically non-conductive feed conduit of the detector device preferably is made of an acid-resistant plastic material such as polyethylene, polypropylene or rubber. Like acid-resistant materials may also be used.

It will be appreciated that the stainless steel tube and the feed conduit are mounted in the housing to provide a unitary construction for placing on top of the battery. Also this mounting arrangement insures that the stainless steel tube forming a probe for determining the desired level of electrolyte is properly positioned a predetermined distance into the cell.

Advantageously, the electrical control means for regulating the addition of conductive liquid to a container, such as the addition of acid electrolyte to a battery cell, may include different types of switching circuits which upon completion of the circuit between the two conductive probes will cause a flow regulating means such as an electrically-operated valve or pump to stop the flow of conductive liquid in the feed circuit. The flow-regulating means, in turn, is connected to a source for the conductive liquid, e.g. a storage tank, portable container, or the like.

BRIEF DESCRIPTION OF THE DRAWINGS

Additional advantages of the liquid level detector device of this invention will become apparent upon reference to the following detailed description of one of its preferred embodiments and to the accompanying drawings, in which.

DESCRIPTION OF THE PREFERRED EMBODIMENT

Figure 1:
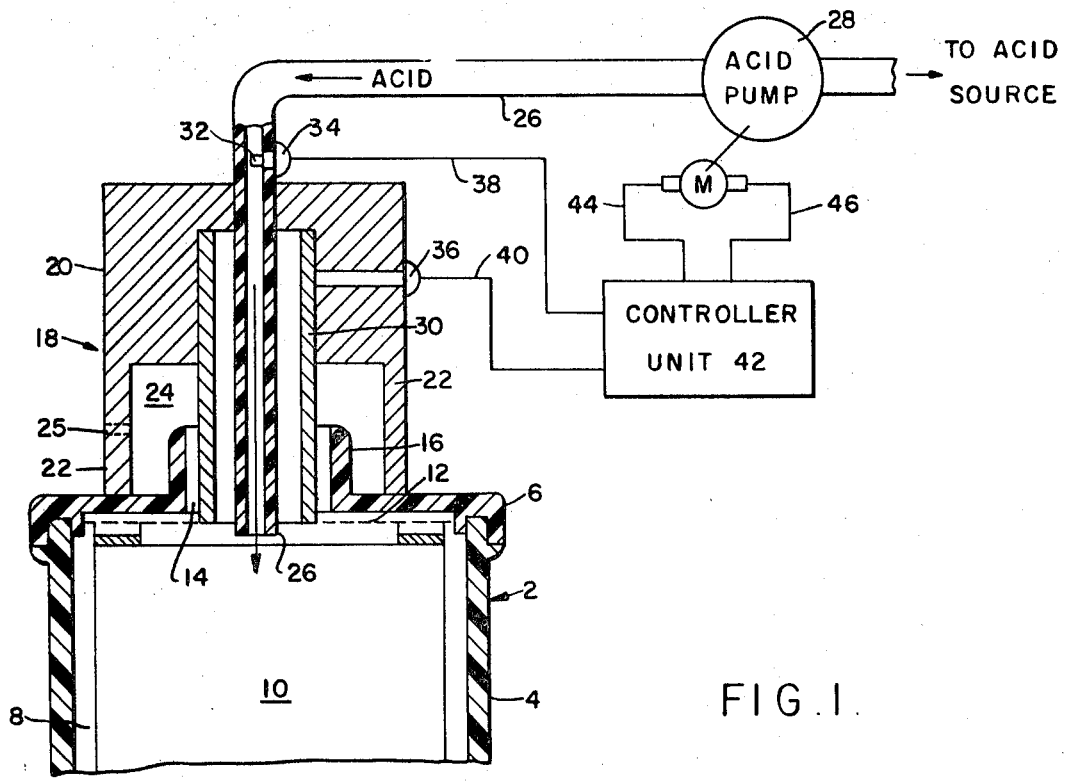
FIG. 1 is a front elevational view of a portion of a storage battery with the casing broken away to show the liquid level detector device of the invention, partially in section, positioned on the battery.

Reference numeral 2 in FIG. 1 designates a storage battery having an outer casing 4 and a cover 6 integrally bonded to the side walls of the casing. Within the casing is provided at least one cell chamber 8. In a multi-cell battery, one or more vertical interior walls (not shown) are also bonded integrally with the cover and casing to form the desired number of cell chambers.

In cell chamber 8, an electrode assembly is schematically shown and designated by reference numeral 10. This assembly is of the conventional design used in acid-lead storage batteries and includes positive and negative plates alternately arranged with suitable separators and with electrical connectors of opposite polarity coupled to the respective positive and negative plates of the assembly. Connection means in the form of terminal posts are electrically connected to the electrode assembly for providing external and/or internal electrical connections in the circuit in which the storage battery is to be utilized. The proper level for acid electrolyte, e.g. sulfuric acid, within the cell chamber is shown by the dashed line designated by reference numeral 12. A filling port or opening 14 is provided in the casing for allowing introduction of electrolyte into each cell, for the subsequent servicing of the battery by the addition of water, and for venting of gases generated within the battery during its operation. The filling port has a smooth-walled raised annular lip 16 which is adapted to engage a vent plug of the type conventionally used for closing such ports. The liquid level detector device of this invention, generally designated by reference numeral 18, is placed on top of the battery cover.

The liquid level detector device of this invention includes a housing 20 made of non-conductive or conductive material, i.e. lead or a non-metallic material such as plastic, in the form of a cylindrical shell. The housing has a lower peripheral wall 22 which defines a chamber 24 and which is adapted to rest on the cover of the battery. In the position shown in FIG. 1, the housing surrounds the raised lip of the filling port and substantially closes off the filling port; one or more venting means in the form of passages or openings 25 are provided in the lower portion of the peripheral side wall for venting of gases from the cell during addition of the acid electrolyte.

A feed conduit or tube 26 made of non-conductive, acid-resistant material, e.g. the tube may be made of plastic such as polyethylene or the like, extends through the housing to provide a filling conduit. One end of the tube is arranged to extend downwardly into the subjacent cell below the desired electrolyte level 12. The tube extends through the upper part of the housing and is connected at its other end to a source of acid for the battery cell. In the embodiment shown, the tube is connected to an acid pump 28 which in turn is connected to an acid supply.

Integrally secured to the interior of the housing is a conductive probe 30, preferably made of a stainless steel in the form of a tube. The probe extends downwardly through the filling port to the desired level of electrolyte within the cell. In the embodiment shown, the stainless steel tube is concentric with and positioned between the peripheral walls of the housing and the feed conduit 26. The housing 18 may be arranged on the battery so that the tube is substantially concentric with the circular opening provided by the filling port.

It will be understood that the housing is so dimensioned that it can be quickly positioned around each filling port of a battery with the feed tube 26 and the probe 30 inserted into the filling port. The stainless steel probe shown may be positioned in contact with or closer to one portion of the raised lip of the filling port. The outer diameter of the tube 30 is smaller than the inner diameter of the filling port to allow space for venting of gases between the tube and the interior surfaces of the filling port during addition of acid.

Another electrically conductive probe 32, preferably made of stainless steel, in the form of a rod or pin, is inserted into the feed tube above the housing. The probe is sealed to the tube by an acid-resistant adhesive, e.g. epoxy resin. One end of this conductive probe is immersed in the stream of acid as it passes through the feed tube into the cell of the battery. An electrical connector 34 is secured to the other end of the probe.

Another electrical connector 36 is attached to the upper portion of the probe 30. In the embodiment shown, the electrical connector 36 extends through the upper part of the housing and is attached to the stainless steel tube in a conductive relationship, e.g. by welding. Connectors 34 and 36 are electrically connected by conductors 38 and 40, respectively, to controller unit 42 having means for applying voltage to one of the two probes.

Acid pump 28 includes an electrical motor which is also electrically connected to unit 42 by conductors 44 and 46.

In the controller unit, electrical means are provided for actuating acid pump 28 and for causing addition of acid to the battery cell and for stopping the pump and the addition of acid when the electrolyte reaches the desired level in the cell, i.e., at the bottom of the stainless steel tube.

In using the device of this invention, the controller unit is actuated, e.g. by manually actuating a push button, to energize pump 28 and thereby cause acid to flow through the feed tube into the cell. When the acid level reaches the bottom of the stainless steel tube 30, current flows from the stainless steel tube via the electrolyte in the cell through the acid electrolyte stream in the supply tube to the probe 32 inserted in the tube. This completes an electrical circuit in the controller unit which causes the acid pump to be shut off. It will be appreciated that due to the relative positioning of the outlet of the acid feed tube and the probes 30 and 32, salt deposits on the surface of the probe 30 cannot cause a short circuit and thereby make the liquid level detector device inoperative or cause premature stoppage of acid to the cell.

Figure 2:
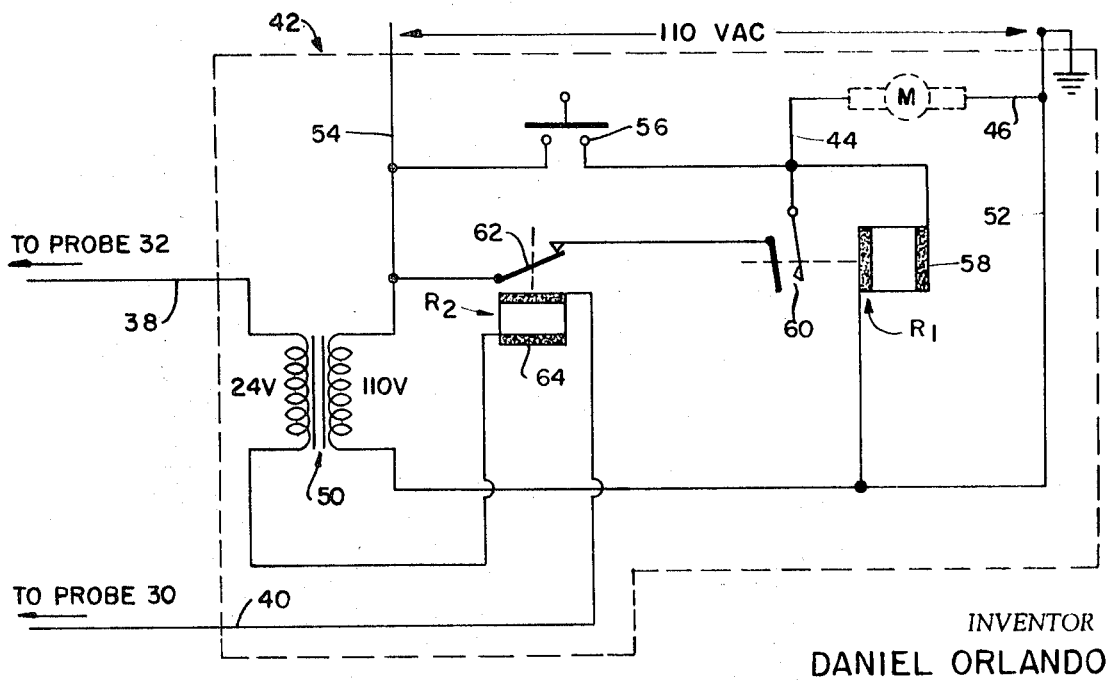
FIG. 2 is a detailed schematic diagram of the electrical circuitry within the controller unit used for controlling the flow of acid to the battery cell.

FIG. 2 shows one embodiment of the electrical circuit means used in controller unit 42 for starting and for stoppoing the acid pump 28. This electrical means comprises a transformer 50, the primary winding of which is placed across a 110 A.C. volt source via conductors 52 and 54. An instantaneous-type on/off push button 56 is connected in parallel across the primary winding of the transformer and is connected to the electric motor which drives acid pump 28. As shown, the push button is electrically connected to one of the conductors which lead to the electrical motor of the acid pump and the other conductor leading to the motor is connected to the other side of the 110 voltage source so that upon closing of the push button the acid pump is energized. In order to facilitate understanding of this embodiment, the acid pump has been shown in the circuit.

Also connected in parallel with the acid pump is a coil 58 of a first relay $R_1$. This relay includes a normally opened switch 60 which is connected to conductor 54 leading from the 110 voltage source via a normally closed switch 62 and one of the conductors leading to the acid pump. A second relay $R_2$ including coil 64 is provided in the secondary winding circuit of the transformer. This secondary winding circuit is connected to the conductors 38 and 40 which lead to probes 30 and 32. The normally closed switch 62 is operatively associated with the coil of relay $R_2$ so that upon actuation of the relay the normally closed switch is opened.

Operation of the controller unit is as follows: Actuation of the instantaneous on/off push button switch by an operator causes a voltage to be applied across the motor of the acid pump. At the same time, relay $R_1$ is actuated thereby causing switch 60 to be closed. Although the contact made by push button is opened when released by the operator the current through relay $R_1$ and normally closed switch 62 maintains the acid pump in operation. Due to the voltage induced into the secondary winding of the transformer 50 electrical current is applied to probe 32. When the electrolyte level in the battery cell reaches the end of the stainless steel tube, i. e. probe 30, the conductive path between the acid stream in the feed conduit and the acid electrolyte in the cell completes an electrical circuit between conductors 38 and 40, thereby energizing coil 64 of relay $R_2$. When this occurs, normally closed switch 62 is opened, thereby de-energizing the acid pump to stop the flow of acid to the cell. Also relay $R_1$ is deenergized and switch 60 resets itself in the open position for the subsequent energizing of the relay $R_1$ by push button 56.

It will be appreciated that flow regulating means other than the acid pump may be controlled by the controller unit. For example, an electrically operated valve may be placed in the feed conduit and be controlled to close when the desired liquid level is obtained. Also, the feed conduit may be made of flexible plastic so that an electrical actuated clamping means would serve to shut off the flow of liquid.

What is claimed is:

1. A liquid level detector device for adding corrosive electrically conductive liquid to a container which comprises an electrically non-conductive feed conduit for directing a stream of corrosive conductive liquid into said container, an end portion of said conduit extending into the container below the desired level of conductive liquid therein, a first fixed electrically conductive probe extending into the container to the desired level of conductive liquid therein outside said conduit, a second fixed electrically conductive probe immersed upstream in the stream of conductive liquid within the other end portion of the feed conduit upstream of said first probe and control means electrically connected to first and second probes and operatively associated with said feed conduit, for stopping the addition of the liquid to said container when the desired level is reached.

2. A liquid level detector device for adding acid electrolyte to a cell of a storage battery which comprises a housing adapted to be placed on the battery above the cell to be filled; an electrically non-conductive feed conduit extending through the housing for directing a stream of acid electrolyte into the cell, the outlet of said conduit being positioned below the desired level of electrolyte in the cell and the inlet of said conduit being positioned above said cell; a first electrically conductive probe extending from said housing into the cell to the desired level; a second fixed electrically conductive probe upstream of said first probe immersed in the stream of acid within the feed conduit within said inlet and outside of the cell; flow regulating means connected to said feed conduit for regulating the flow of acid to the cell and control means electrically connected to said probes and to the flow regulating means for causing the flow of acid electrolyte to be directed to the cell until the desired electrolyte level is reached at which point said flow is terminated.

3. The detector device of claim 2 in which the first conductive probe is a stainless steel tube, one end of which is mounted in the housing and the other end being positioned at the desired level of electrolyte in the cell.

4. The detector device of claim 3 in which said feed conduit is a plastic tube arranged concentric with the stainless steel tube.

5. The detector device of claim 4 in which the stainless steel tube and the feed conduit are mounted closely adjacent to each other in the housing to provide a unitary filling arrangement that can be readily inserted into a filling port of the cell to be filled.

6. The detector device of claim 2 in which said flow regulating means is an electrically operated pump and the electrical control means includes normally de-energized switching means for stopping the pump when the electrolyte reaches the desired level in the cell.

References Cited
UNITED STATES PATENTS

| | | | |
|---|---|---|---|
| 308,979 | 12/1884 | Palmatier | 340—244 C |
| 1,256,065 | 2/1918 | Sheinaus | 141—389 X |
| 1,471,238 | 10/1923 | Buckhard | 136—162 UX |
| 1,820,981 | 9/1931 | Le Fever | 137—392 |
| 3,504,205 | 3/1970 | Sheckler | 141—198 X |

LAVERNE D. GEIGER, Primary Examiner

E. J. EARLS, Assistant Examiner

U.S. Cl. X.R.

136—162; 137—392; 141—382